(12) United States Patent
Choi (10) Patent No.: US 10,706,710 B2
(45) Date of Patent: Jul. 7, 2020

(54) METHOD AND APPARATUS FOR PROVIDING REMINDER BASED ON CHAT ROOM

(71) Applicants: DELTA PDS CO., LTD., Seoul (KR); Jae Ho Choi, Seoul (KR)

(72) Inventor: Jae Ho Choi, Seoul (KR)

(73) Assignees: DELTA PDS CO., LTD., Seoul (KR); Jae Ho Choi, Seoul (KR)

( * ) Notice: Subject to any disclaimer, the term of this patent is extended or adjusted under 35 U.S.C. 154(b) by 158 days.

(21) Appl. No.: 15/794,188

(22) Filed: Oct. 26, 2017

(65) Prior Publication Data

US 2018/0130334 A1 May 10, 2018

(30) Foreign Application Priority Data

Nov. 8, 2016 (KR) .................. 10-2016-0148354

(51) Int. Cl.
*G08B 21/24* (2006.01)
*G06Q 10/10* (2012.01)
(Continued)

(52) U.S. Cl.
CPC ......... *G08B 21/24* (2013.01); *G06Q 10/1097* (2013.01); *H04L 12/1813* (2013.01); *H04L 51/20* (2013.01)

(58) Field of Classification Search
CPC ..... G08B 21/24; H04L 12/1813; H04L 51/00; H04L 51/04; H04L 51/20; H04N 21/4788;
(Continued)

(56) References Cited

U.S. PATENT DOCUMENTS 8,566,438 B2 * 10/2013 Wisniewski ............ H04L 51/34
709/207
8,639,552 B1 * 1/2014 Chen ..................... G06F 9/4881
705/7.21
(Continued)

FOREIGN PATENT DOCUMENTS

JP     2003-178004 A     6/2003
JP     2008-301435 A    12/2008
(Continued)

OTHER PUBLICATIONS

Japanese Office Action for related JP application No. 2017-215133 dated Oct. 2, 2018 from Japanese Patent Office.

*Primary Examiner* — James R Sheleheda
(74) *Attorney, Agent, or Firm* — Paratus Law Group, PLLC (57) ABSTRACT

A method of providing a reminder based on a chat room performed by a chat room based reminder apparatus connected to at least one user terminal, the method including: bringing a message thread corresponding to a chat room related to a user terminal and a to-do item set of at least one to-do item related to the message thread and including a to-do receiver, a to-do provider, to-do contents, a to-do status, and a deadline; generating a reminder set including at least one reminder to-do item satisfying a reminder condition in the to-do item set; generating a reminder message for each of the at least one reminder to-do item; and detecting a time zone of the to-do receiver and delaying to add the reminder message to the message thread to a receivable time of the to-do receiver.

16 Claims, 7 Drawing Sheets

(51) Int. Cl.
   *H04L 12/18* (2006.01)
   *H04L 12/58* (2006.01)

(58) Field of Classification Search
   CPC ............. H04N 21/4524; G06Q 10/109; G06Q 10/1093; G06Q 10/1097
   See application file for complete search history.

(56) References Cited

U.S. PATENT DOCUMENTS

| | | | |
|---|---|---|---|
| 8,645,178 B2* | 2/2014 | Nguyen | G06Q 10/06 705/7.15 |
| 8,798,445 B2* | 8/2014 | Marks | G06Q 30/02 386/299 |
| 8,880,436 B2* | 11/2014 | Chan | G06Q 10/103 705/301 |
| 9,356,790 B2* | 5/2016 | Zambetti | H04L 12/1813 |
| 9,762,523 B1* | 9/2017 | Roy | H04L 51/14 |
| 9,792,570 B2* | 10/2017 | Karlson | G06Q 10/109 |
| 9,990,610 B2* | 6/2018 | Agarwal | G06Q 10/107 |
| 10,127,227 B1* | 11/2018 | Badr | G06F 3/167 |
| 10,235,646 B2* | 3/2019 | Perry | G06Q 10/063112 |
| 10,241,644 B2* | 3/2019 | Gruber | G06Q 10/1097 |
| 2003/0004774 A1* | 1/2003 | Greene | G06Q 10/063112 705/7.14 |
| 2003/0009536 A1* | 1/2003 | Henderson | G06Q 10/10 709/219 |
| 2004/0064351 A1* | 4/2004 | Mikurak | G06Q 10/087 705/22 |
| 2005/0120108 A1* | 6/2005 | Wisniewski | G06Q 10/107 709/224 |
| 2006/0069605 A1* | 3/2006 | Hatoun | G06Q 10/063114 705/7.15 |
| 2007/0282660 A1* | 12/2007 | Forth | G06Q 10/06311 705/7.15 |
| 2008/0147774 A1* | 6/2008 | Tummalapenta | G06Q 10/06 709/202 |
| 2008/0161027 A1 | 7/2008 | Benco et al. | |
| 2009/0049131 A1* | 2/2009 | Lyle | H04L 51/04 709/206 |
| 2009/0222837 A1* | 9/2009 | Sugahara | G06Q 10/06 718/105 |
| 2009/0313336 A1* | 12/2009 | Haynes | H04L 51/043 709/206 |
| 2010/0269049 A1* | 10/2010 | Fearon | G06Q 10/109 715/744 |
| 2011/0112881 A1* | 5/2011 | Malhotra | G06Q 10/10 705/7.21 |
| 2011/0154338 A1* | 6/2011 | Ramanathaiah | G06Q 10/06 718/100 |
| 2011/0208822 A1* | 8/2011 | Rathod | G06F 16/9535 709/206 |
| 2011/0276896 A1* | 11/2011 | Zambetti | H04L 12/1813 715/751 |
| 2011/0307286 A1* | 12/2011 | Haynes | G06Q 10/109 705/7.19 |
| 2012/0158865 A1* | 6/2012 | Kurian | G06Q 10/06311 709/206 |
| 2012/0203551 A1* | 8/2012 | Lakshmanan | G06Q 10/109 704/235 |
| 2012/0278117 A1* | 11/2012 | Nguyen | G06Q 10/06 705/7.15 |
| 2012/0316962 A1* | 12/2012 | Rathod | G06Q 10/107 705/14.54 |
| 2012/0317499 A1* | 12/2012 | Shen | H04L 51/04 715/752 |
| 2013/0007139 A1* | 1/2013 | Bombacino | H04L 51/16 709/206 |
| 2013/0073343 A1* | 3/2013 | Richardson | G06Q 30/02 705/7.38 |
| 2013/0115927 A1* | 5/2013 | Gruber | H04W 4/16 455/414.1 |
| 2013/0179515 A1* | 7/2013 | Chi | H04L 29/06401 709/206 |
| 2013/0212583 A1* | 8/2013 | Gordon | G06F 9/44 718/100 |
| 2014/0032671 A1* | 1/2014 | Chhatrapati | G06Q 10/06 709/204 |
| 2014/0081695 A1* | 3/2014 | Rokosz | G06Q 10/06311 705/7.19 |
| 2014/0208325 A1* | 7/2014 | Chen | G06F 9/4881 718/102 |
| 2014/0215472 A1* | 7/2014 | Motahari Nezhad | G06Q 10/1097 718/102 |
| 2014/0244653 A1* | 8/2014 | Plotkin | G06Q 10/06311 707/741 |
| 2015/0215246 A1* | 7/2015 | Lung | G06F 3/04817 715/752 |
| 2015/0310188 A1* | 10/2015 | Ford | G06F 21/10 726/28 |
| 2015/0334469 A1* | 11/2015 | Bhatia | H04N 21/252 725/32 |
| 2015/0363092 A1* | 12/2015 | Morton | H04L 51/046 715/752 |
| 2016/0077674 A1* | 3/2016 | Forster | G06F 3/0481 715/753 |
| 2016/0112362 A1* | 4/2016 | Perazzo | G06Q 10/109 455/466 |
| 2016/0247110 A1* | 8/2016 | Sinha | G06Q 10/06316 |
| 2016/0301633 A1* | 10/2016 | Killoran, Jr. | G06Q 10/063112 |
| 2017/0083876 A1* | 3/2017 | Prakash | H04W 4/029 |
| 2017/0091717 A1* | 3/2017 | Chandraghatgi | G06Q 10/1097 |
| 2017/0103362 A1* | 4/2017 | Choi | G06Q 10/063114 |
| 2018/0032956 A1* | 2/2018 | Choi | G06F 16/2246 |
| 2018/0039926 A1* | 2/2018 | Karlson | G06Q 10/109 |
| 2018/0114198 A1* | 4/2018 | Ghotbi | G06Q 10/1097 |
| 2018/0130334 A1* | 5/2018 | Choi | G08B 21/24 |
| 2018/0152407 A1* | 5/2018 | Soni | H04L 51/04 |
| 2018/0204183 A1* | 7/2018 | Choi | G06Q 10/103 |
| 2018/0260864 A1* | 9/2018 | Leclercq | G06Q 30/0613 |
| 2018/0302231 A1* | 10/2018 | Sung, II | G06Q 10/1097 |
| 2018/0322440 A1* | 11/2018 | Ren | G06F 16/288 |
| 2018/0336520 A1* | 11/2018 | Davis | G06Q 10/101 |
| 2018/0341925 A1* | 11/2018 | Leske | G06Q 10/1095 |
| 2019/0014070 A1* | 1/2019 | Mertvetsov | H04L 51/24 |
| 2019/0066051 A1* | 2/2019 | Huang | H04L 51/36 |

FOREIGN PATENT DOCUMENTS

| | | |
|---|---|---|
| JP | 2014-106592 A | 6/2014 |
| KR | 10-2009-0094344 A | 9/2009 |
| KR | 10-1506272 B1 | 3/2015 |

* cited by examiner

METHOD AND APPARATUS FOR PROVIDING REMINDER BASED ON CHAT ROOM

CROSS REFERENCE TO PRIOR APPLICATION

This application claims priority to Korean Patent Application No. 10-2016-0148354 (filed on Nov. 8, 2016), which is hereby incorporated by reference in its entirety.

BACKGROUND

Technical Field

The present invention relates to reminder technology based on a chat room, and more particularly, to a method and apparatus for providing a reminder based on a chat room that can improve work efficiency by providing a reminder of to-do appropriately to a time zone of a to-do receiver.

Description of Related Art

An Internet messenger corresponds to an application that transmits a message including a character or graphic to users and may be implemented into a chat room in which a plurality of users participate. In an exemplary embodiment, an Internet messenger may include a mobile messenger to be performed in a mobile environment (e.g., a mobile phone) and may include, for example, Kakaotalk, Line, WeChat, and Facebook messengers.

In order to transmit a user intention to another party through a message, the Internet messenger may notify a user whether another party reads a message and a participation status of another party in a chat room. While the number of users using the Internet messenger rapidly increases, applications using in a mobile environment have been very variously developed, and a to-do management program among them have been used by many users.

A conventional to-do management program based on an Internet messenger may provide a reminder of to-do in order to increase efficiency of to-do management. Conventional technology has a drawback that does not reflect a situation of a receiver that may be changed in real time when providing a reminder and that does not provide an appropriate reminder to a major receiver in a situation in which a reminder target may be changed according to a to-do execution status.

Korean Patent No. 10-1506272 (registered on Mar. 20, 2015) relates to a method of providing a reminder with an instant messaging application executed at a computing device, and the method includes a step of receiving a text input from an instant messaging application. A reminder-triggering condition is determined based on a predetermined symbol within a text input in response to reception of the text input. An instant message including a reminder-triggering condition of a reminder is transmitted.

Korean Patent Laid-Open Publication No. 10-2009-0094344 (laid-open on Sep. 4, 2009) relates to an active messaging method of triggering future reminders, and a method of providing an appointment reminder includes steps of: generating an appointment reminder message; transmitting an appointment reminder message from a first device of a first party concerned to a second device of a second party concerned; receiving an appointment reminder message from the second device at a first time point; storing the appointment reminder message at the second device; and activating an appointment reminder message stored at the second device at the second time point after the first time point.

PRIOR ART DOCUMENT

Patent Document

1. Korean Patent No. 10-1506272 (registered on Mar. 20, 2015)
2. Korean Patent Laid-Open Publication No. 10-2009-0094344 (laid-open on Sep. 4, 2009)

SUMMARY

The present invention has been made in view of the above problems and provides a method and apparatus for providing a reminder based on a chat room that can improve work efficiency by providing a reminder of to-do appropriately to a time zone of a to-do receiver.

The present invention further provides a method and apparatus for providing a reminder based on a chat room that can provide an optimized reminder message by considering a situation in which a reminder target is changed according to a to-do execution status and by reflecting a receivable time based on a local time of a major receiver of a reminder.

The present invention further provides a method and apparatus for providing a reminder based on a chat room that can provide today to-do based on reminder to-do items related to a user terminal.

In accordance with an aspect of the present invention, a method of reminding based on a chat room performed by a chat room based reminder apparatus connected to at least one user terminal includes steps of: (a) bringing a message thread corresponding to a chat room related to a user terminal and a to-do item set of at least one to-do item related to the message thread and including a to-do receiver, a to-do provider, to-do contents, a to-do status, and a deadline; (b) generating a reminder set including at least one reminder to-do item satisfying a reminder condition in the to-do item set; (c) generating a reminder message for each of the at least one reminder to-do item; and (d) detecting a time zone of the to-do receiver and delaying to add the reminder message to the message thread to a receivable time of the to-do receiver.

The reminder condition may be determined based on at least one of the to-do status and the deadline.

The step (b) may include a step of determining reminder urgency based on a to-do status and a deadline of each of at least one reminder to-do item satisfying the reminder condition.

The step (c) may include a step of determining a generation frequency of the reminder message based on the reminder urgency.

The step (d) may include a step of detecting the time zone based on a local time of a user terminal related to the to-do receiver, when a fixing request of the time zone received from the to-do receiver is not determined and detecting the time zone based on the fixing request, when a fixing request of the time zone received from the to-do receiver is determined.

The step (b) may include a step of updating the reminder set based on a time zone of the detected to-do receiver.

The step (d) may include a step of detecting a time zone of a to-do provider, when a to-do status of the reminder to-do item is a complete status and delaying to add the reminder message to a message thread to a receivable time of the to-do provider.

The step (d) may include a step of detecting a time zone of each of the at least two to-do receivers and delaying to add the reminder message to the message thread to an intersection time of receivable times of the two to-do receivers, when the to-do receiver is at least two persons and when the at least two to-do receivers are related to the same chat room.

The step (d) may include a step of delaying to add the reminder message to the message thread to a receivable time of a preferentially designated to-do receiver among the at least two to-do receivers, when the intersection time is not determined.

The step (b) may include a step of providing today to-do based on the at least one reminder to-do item to the user terminal.

The step (c) may include a step of generating the reminder message including a status change button that changes summary information and a to-do status of each of the at least one reminder to-do item to a next to-do status.

The step (a) may include a step of calculating a to-do processing speed based on the providing number of a reminder message already added to the message thread for each of the at least one to-do item and including the to-do processing speed in the to-do item.

The step (a) may include a step of calculating an average to-do processing speed based on at least one to-do item in which the at least one member is related as a to-do provider among the to-do item sets and providing the average to-do processing speed to the user terminal, when a to-do processing speed providing request related to a user and including at least one member is received from the user terminal.

The method may further include a step (e) of detecting a time zone of a to-do receiver and delaying to add a to-do item to a message thread to a receivable time of the to-do receiver, when the user terminal requests addition of a specific to-do item to a specific message thread corresponding to a chat room related thereto.

In accordance with another aspect of the present invention, a chat room based reminder apparatus includes: a to-do item set preparation unit that brings a message thread corresponding to a chat room related to a user terminal and a to-do item set of at least one to-do item related to the message thread and including a to-do receiver, a to-do provider, to-do contents, a to-do status, and a deadline; a reminder set generator that generates a reminder set including at least one reminder to-do item satisfying a reminder condition at the to-do item set; a reminder message generator that generates a reminder message of each of the at least one reminder to-do item; and a time zone-reminder management unit that detects a time zone of the to-do receiver and that delays to add the reminder message to the message thread to a receivable time of the to-do receiver.

In accordance with another aspect of the present invention, a recording medium that records a reminder method based on a chat room performed by a chat room based reminder apparatus connected to at least one user terminal, wherein the chat room based reminder method includes steps of: (a) bringing a message thread corresponding to a chat room related to a user terminal and a to-do item set of at least one to-do item related to the message thread and including a to-do receiver, a to-do provider, to-do contents, a to-do status, and a deadline; (b) generating a reminder set including at least one reminder to-do item satisfying a reminder condition at the to-do item set; (c) generating a reminder message of each of the at least one reminder to-do item; and (d) detecting a time zone of the to-do receiver and delaying to add the reminder message to the message thread to a receivable time of the to-do receiver.

DETAILED DESCRIPTION

A description of the present invention is merely an exemplary embodiment for a structural or functional description of the present invention and thus it should not be analyzed that the scope of the present invention is limited by an exemplary embodiment described in a detailed description. That is, because an exemplary embodiment may be variously changed and have several forms, it should be understood that the scope of the present invention include equivalents that can realize the spirit thereof. Further, it does not mean that a specific exemplary embodiment should include the entire following objects or effects or should include only the following effects and thus it should not be understood that the scope of the present invention is limited thereto.

A meaning of terms described in an exemplary embodiment of the present invention should be understood as follows.

A term such as "first" and "second" is used for distinguishing an element from another element and the scope of the present invention is not limited by the terms. For example, a first element may be referred to as a second element and similarly, a second element may be referred to as a first element.

When it is described that an element is "connected" or "electrically connected" to another element, the element may be "directly connected" or "directly electrically connected" to the other elements or may be 'connected" or "electrically connected" to the other elements through a third element. However, when it is described that an element is "directly connected" or "directly electrically connected" to another element, no element may exist between the element and the other element. Other expressions, i.e., "between" and "immediately between" or "adjacent to" and "directly adjacent to" describing a relationship between elements should be similarly analyzed.

Singular forms used here include a plurality of forms unless phrases explicitly represent an opposite meaning, and a term of "comprising" or "having" used in a specification embodies a characteristic, number, step, operation, element, component, or combination thereof and does not exclude presence or addition of another characteristic, number, step, operation, element, component, or combination thereof.

In each step, identification symbols (e.g., a, b, and c) are used for convenience of description and do not describe order of each step, and unless each step does not clearly describe specific order in a context, each step may occur differently from listed order. That is, each step may occur in the same order as listed order, may be substantially simultaneously performed, and may be performed in opposite order.

Unless differently defined, entire terms used here have the same meaning as a meaning that may be generally understood by a person of common skill in the art. It should be analyzed that terms defined in a generally using dictionary have a meaning corresponding with that of a context of related technology and are not analyzed as an ideal or excessively formal meaning unless explicitly defined in the present invention.

Figure 1:
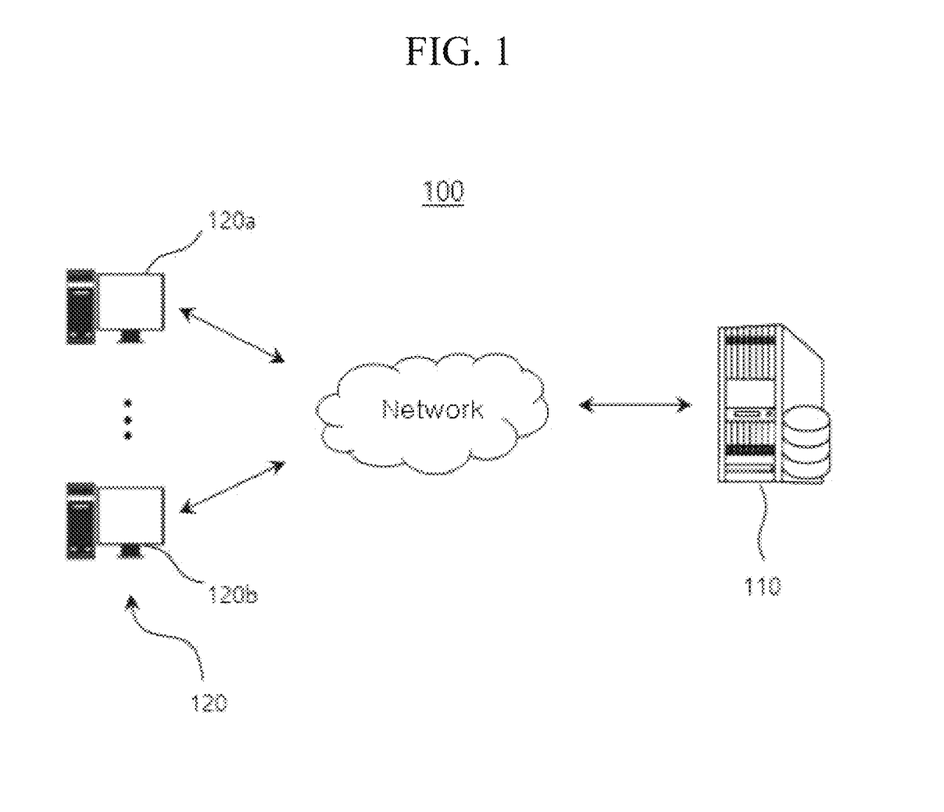
FIG. 1 is a diagram illustrating a reminder system based on a chat room according to an exemplary embodiment of the present invention.

FIG. 1 is a diagram illustrating a reminder system based on a chat room according to an exemplary embodiment of the present invention.

Referring to FIG. 1, a chat room based reminder system 100 includes a chat room based reminder apparatus 110 and a user terminal 120, and the chat room based reminder apparatus 110 and the user terminal 120 may be connected through a network.

The chat room based reminder apparatus 110 may be connected to at least one user terminal 120 and may manage a message thread that forms a message transmitted from at least one user terminal 120 in a group. In an exemplary embodiment, the message thread may be implemented into a chat room of an Internet messenger or a chat room. For example, the chat room based reminder apparatus 110 may manage a plurality of message threads, and the message threads each may include a plurality of user terminals 120, and the chat room based reminder apparatus 110 may manage a plurality of user terminals 120 of each of the message threads.

The user terminal 120 may correspond to a computing device connected to the chat room based reminder apparatus 110 and may be implemented into, for example, a desktop computer, a notebook computer, a tablet PC, or a smart phone. In an exemplary embodiment, a first user terminal 120a may correspond to a mobile terminal and may be connected to the message server 110 through cellular communication or WiFi communication. In another exemplary embodiment, a second user terminal 120b may correspond to a desktop computer and may be connected to the message server 110 through Internet.

Figure 2:
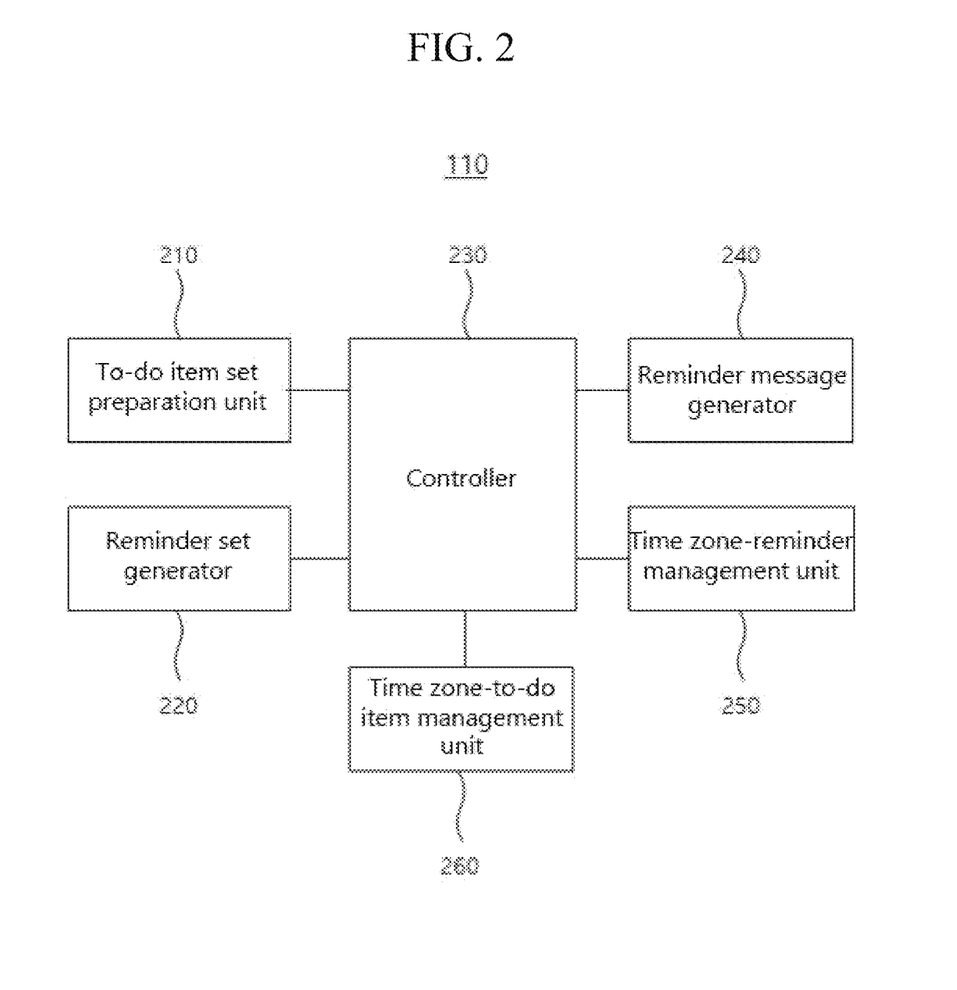
FIG. 2 is a block diagram illustrating a chat room based reminder apparatus of FIG. 1.

FIG. 2 is a block diagram illustrating a chat room based reminder apparatus of FIG. 1.

Referring to FIG. 2, the chat room based reminder apparatus 110 may include a to-do item set preparation unit 210, a controller 220, a reminder set generator 230, a reminder message generator 240, a time zone-reminder management unit 250, and a time zone-to-do item management unit 260.

The chat room based reminder apparatus 110 may be connected to at least one user terminal 120 to perform a method of providing a reminder based on a chat room. Here, at least one user terminal 120 each may be related to at least one of a to-do receiver and a to-do provider for each of at least one to-do item.

The to-do item set preparation unit 210 may bring a message thread corresponding to a chat room related to the user terminal 120 and a to-do item set of at least one to-do item related to the message thread. In an exemplary embodiment, at least one to-do item each may include a to-do receiver, a to-do provider, to-do contents, a to-do status, and a deadline. Here, the to-do status is summary contents of an execution status on a processing step basis of to-do and may include a 'new' status, a 'doing' status, a 'done' status, and a 'confirmation' status. The 'new' status is a newly generated to-do item and represents a to-do item that does not receive a response of a to-do receiver, the 'doing' status is a status that receives a response to a to-do item from the to-do receiver and represents a situation in which the to-do receiver is processing a to-do item, the 'done' status is a status in which the to-do receiver completes a to-do item and represents a status that awaits a response to work completion from the to-do provider, and the 'confirmation' status represents a status in which the to-do provider confirms a complete work of the to-do receiver.

The to-do item set preparation unit 210 may receive at least one to-do item through the user terminal 120 of the to-do provider, store the received to-do item at a memory unit (not shown) to manage adjustment, deletion, and update of the received to-do item. In an exemplary embodiment, the to-do item set preparation unit 210 may receive a to-do item from the user terminal 120 within a chat room of a messenger, and when the to-do item is received, the to-do item set preparation unit 210 may update a message thread corresponding to a chat room related to the user based on the to-do item and a to-do item set related to the message thread. When a response to a to-do status of a to to-do item is received through the user terminal 120 related to the to-do provider or the to-do receiver, the to-do item set preparation unit 210 may update a to-do status of a to-do item.

The reminder set generator 230 may generate a reminder set based on a reminder condition. In an exemplary embodiment, the reminder set includes at least one reminder to-do item satisfying a reminder condition in a to-do item set. In an exemplary embodiment, the reminder indicates a series of processes for increasing management efficiency of a to-do item by reminding an execution status of a to-do item to the to-do receiver or the to-do provider.

The reminder condition means at least one reference condition for determining whether a reminder of at least one to-do item is required. In an exemplary embodiment, the reminder condition may be determined based on at least one of a to-do status and a deadline. For example, when the to-do status is a 'new' status, the to-do item may correspond to a to-do item requiring a reminder satisfying a reminder condition from a next day in which the to-do status becomes a 'new' status until the to-do status is changed to a 'doing' status, when the to-do status is a 'doing' status, the to-do item may correspond to a to-do item requiring a reminder satisfying a reminder condition from before one day of a deadline until the to-do status is changed to a 'done' status, and when the to-do status is a 'done' status, the to-do item may correspond to a to-do item requiring a reminder satisfying a reminder condition from a next day in which the to-do status is changed to a 'done' status until the to-do status is changed to a 'complete' status.

In an exemplary embodiment, when a to-do status of a plurality of to-do statuses does not correspond to a complete status, a reminder condition may be determined to require a reminder, and the reminder set generator 230 may generate a reminder set that detects and includes at least one reminder to-do item satisfying such a reminder condition among a plurality of to-do items included in a to-do item set. For example, when a to-do status of each of to-do items corresponds to a 'new', 'doing', or 'done' status, the reminder set generator 230 may determine a reminder condition so as to determine that a reminder is required, and when a to-do status of each of to-do items corresponds to a 'confirmation' status, the reminder set generator 230 may determine a reminder condition so as to determine that a reminder is not required.

The reminder set generator 230 may determine reminder urgency based on a to-do status and a deadline of each of at least one reminder to-do item. In an exemplary embodiment, the reminder set generator 230 may determine whether the difference day number to a deadline according to a to-do status of each of at least one reminder to-do item satisfying a reminder condition satisfies a specific condition to determine reminder urgency and relate the determined reminder urgency to the reminder to-do item. For example, when a to-do status of each of reminder to-do items included in a reminder set corresponds to a 'new' status, the reminder set generator 230 may determine to urgent from before 1 day of a deadline, when a to-do status of each of reminder to-do items included in a reminder set corresponds to a 'doing' status, the reminder set generator 230 may determine the to-do status to urgent from the day of the deadline, and when a to-do status of each of reminder to-do items included in a reminder set corresponds to a 'done' status, the reminder set generator 230 may determine the to-do status to urgent from after 1 day of the deadline.

The reminder set generator 230 may provide today to-do based on at least one reminder to-do item included in a reminder set to the user terminal. In an exemplary embodiment, the reminder set generator 230 may provide today to-do that visualizes a reminder set including reminder to-do items related to the user terminal 120 to the user terminal 120. In an exemplary embodiment, the today to-do corresponds to a list of reminder to-do items, and may be aligned according to reminder urgency or may be aligned or classified in consideration of user convenience based on a correlation with the user terminal 120. For example, the reminder set generator 230 may classify today to-do into 'request to all', 'my request', 'received request', or 'referred request' to provide the classified today to-do to the user terminal 120. In an exemplary embodiment, when a to-do status included in the reminder to-do item is changed, the reminder set generator 230 may update a reminder set based on a to-do item set including an updated to-do item to reflect the updated reminder set to the today to-do. In an exemplary embodiment, the reminder set generator 230 may receive an interaction of the to-do receiver through today to-do provided through a messenger installed in the user terminal 120 to update a to-do status of the to-do item, and for example, the reminder set generator 230 may receive an interaction from the to-do receiver through a to-do status change button (click when wanting to change to a done status) of a to-do item 710 (see FIG. 7) of 'determine strength with a sample test' through today to-do 700 (see FIG. 7).

The controller 220 may control an entire operation of the chat room based reminder apparatus 110 and control data flow between the to-do item set preparation unit 210, the reminder set generator 230, the reminder message generator 240, the time zone-reminder management unit 250, and the time zone-to-do item management unit 260. In an exemplary embodiment, the controller 220 may be implemented into a Central Processing Unit (CPU) of the chat room based reminder apparatus 110.

The reminder message generator 240 may generate a reminder message of each of at least one reminder to-do item. In an exemplary embodiment, the reminder message may include summary information about at least one of a to-do receiver, a to-do provider, to-do contents, a to-do status, and a deadline included in the reminder to-do item.

The reminder message generator 240 may generate a reminder message including a status change button that changes a to-do status of each of at least one reminder to-do item to a next to-do status. In an exemplary embodiment, when a current to-do status of a reminder to-do item is a 'new' status, the reminder message generator 240 may change the to-do status to a 'doing' status using the to-do receiver as a target, and when a current to-do status of a reminder to-do item is a 'doing' status, the reminder message generator 240 may change the to-do status to a 'done' status using the to-do receiver as a target, and when a current to-do status of a reminder to-do item is a 'done' status, the reminder message generator 240 may generate a reminder message including a status change menu that may change the to-do status to a 'confirmation' status using the to-do provider as a target, and when a current to-do status of a reminder to-do item is a 'confirmation' status, the reminder message generator 240 may no longer generate a reminder message to be related to the reminder to-do item. In an exemplary embodiment, when a change request of the to-do status is received from the user terminal 120 through the status change button, the reminder message generator 240 may request to update each of a to-do item set and a reminder set in the to-do item set preparation unit 210 and the reminder set generator 230.

The reminder message generator 240 may determine a generation frequency of the reminder message based on reminder urgency. In an exemplary embodiment, the reminder message generator 240 may determine a remind frequency of a reminder to-do item determined to urgent according to a reminder urgency determination result by the reminder set generator 230 based on Equation 1. For example, by applying a to-do status determined based on a to-do status of a specific reminder to-do item related to the user terminal 120 and deadline delay determined based on a deadline to Equation 1, the reminder message generator 240 may calculate a value of a remind frequency, and when a current to-do status is a 'new' status and exceeds a deadline by 2 days, a remind frequency becomes 3. In an exemplary embodiment, the reminder message generator 240 may adjust a frequency that generates a reminder message based on a remind frequency and for example, when a to-do item is not urgent, the reminder message generator 240 may generate a reminder message one time at one day, but when a to-do item is urgent, the reminder message generator 240 may generate a reminder message three times at 1 day according to a remind frequency (e.g., 3) and a specific time cycle (e.g., one time at 2 hours).

$$\text{Remind Frequency} = \left\lceil \frac{\text{Status} - \text{Delay}}{\text{Status}} \right\rceil \qquad \text{[Equation 1]}$$

where Status is a to-do status and when a to-do status is 'new', Status corresponds to 1, when a to-do status is 'doing', Status corresponds to 2, when a to-do status is 'done', Status corresponds to 3 (when a corresponding to-do status is 'confirmation', Status does not satisfy a reminder condition), Delay is a deadline delay and corresponds to the difference day number (e.g., when a deadline is May 10 and today is May 7, the difference day number is +3, and when a deadline is May 10 and today is May 12, the difference day number is −2) to a deadline based on a current date and time, and ⌈ ⌉ means a calculation that takes an absolute value of an internal value and that obtains an integer by raising a decimal point, and when values of Status and Delay are the same, a remind frequency is 1.

In the foregoing exemplary embodiment, an illustration of a calculation result of a remind frequency based on Equation 1 may be represented with Table 1.

TABLE 1

| To-do status | Deadine delay | Remind frequency |
|---|---|---|
| New | Before one day | 1 |
| (Status = 1) | After one day | 2 |
| | After two days | 3 |
| Doing | Today | 1 |
| (Status = 2) | After one day | 2 |
| | After three days | 3 |
| Done | Today | 1 |
| (Status = 3) | After one day | 2 |
| | After four days | 3 |

In an exemplary embodiment, in a process of generating a reminder message of a reminder to-do item determined to urgent, the reminder message generator 240 may add a visual display to a portion of the message to distinguish a general reminder message and an urgent reminder message.

The reminder message generator 240 may determine a specific repetition reference based on a to-do status and a deadline of each of reminder to-do items to generate a reminder message according to the specific repetition reference, and in an exemplary embodiment, the reminder message generator 240 may determine a specific time cycle t to transmit a reminder message based on Equation 2 to a specific repetition reference. For example, in a reminder to-do item in which a deadline is 2017-03-31 and in which the to-do status is a 'doing' status, when it is assumed that a current date is 2017-03-27 (d=4, s=2) and $t_0$=12 (time), the reminder message generator 240 may calculate that t=20 (time) and thus transmit a reminder message after 20 hours, and after a reminder message is transmitted, the reminder message generator 240 may recalculate a specific time cycle t at a transmitting time point and reserve transmission of the reminder message according to a recalculated cycle. Accordingly, as a deadline approaches and as a to-do status approaches to an initial status, the reminder message generator 240 may provide a reminder message in a shorter repetition cycle.

$$t = (d \times s) + t_0 \quad (d > 0)$$
$$t = t_0 + \frac{d}{s} \quad (d \leq 0)$$
$$0 < t_{min} < t < t_{max}$$

[Equation 2]

where d means the day number (day) left to a deadline designated by the to-do provider for the to-do item (may be represented with a positive value before a deadline and with a negative value after a deadline), s represents a to-do status representing a current to-do status of the to-do item (e.g., 'new' status: s=1, 'doing' status: s=2, 'done' status: s=3, $t_{min}$, $t_0$, and $t_{max}$ correspond to a minimum cycle, a basic cycle, and a maximum cycle, respectively that may be set by a user or a designer, and may be set to, for example 3, 12, and 48 (hour)).

The time zone-reminder management unit 250 may detect a time zone of the to-do receiver related to each of at least one reminder to-do item included in a reminder set. In an exemplary embodiment, a time zone is a local time to be a reference when performing a specific work. In an exemplary embodiment, the time zone-reminder management unit 250 may detect a current time of a region in which the user terminal 120 related to the to-do receiver is positioned as a time zone of the to-do receiver.

When a fixing request of a time zone received from the to-do receiver is not determined, the time zone-reminder management unit 250 may detect a time zone based on a local time of the user terminal 120 related to the to-do receiver, and when a fixing request of a time zone received from the to-do receiver is determined, the time zone-reminder management unit 250 may detect a time zone based on the fixing request. More specifically, the time zone-reminder management unit 250 may determine whether a fixing request of the time zone is received from the to-do receiver, and if a fixing request of the time zone is not received from the to-do receiver, the time zone-reminder management unit 250 may detect a current time of a region in which the user terminal 120 related to the to-do receiver is positioned as a time zone of the to-do receiver, and if a fixing request of the time zone is received from the to-do receiver, the time zone-reminder management unit 250 may detect a specific local time included in contents of the fixing request as a time zone of the to-do receiver. For example, when the to-do receiver is in New York of the US for a business trip, a local time of the user terminal 120 related to the to-do receiver may be different from a reference time (e.g., a Korean current time) in which the time zone-reminder management unit 250 uses as a reference, when a time zone fixing request does not exist from the user terminal 120 of the to-do receiver, the time zone-reminder management unit 250 may detect a local time of New York as a time zone, and when a time zone fixing request including information about a specific local time in which the to-do receiver previously determines exists (e.g., fix a time zone to 11 AM based on a New York time of the US or 10 AM based on a Korean time), the time zone-reminder management unit 250 may determine a time zone according to the local time.

The time zone-reminder management unit 250 may determine a receivable time of the to-do receiver based on a time zone. In an exemplary embodiment, a receivable time of the to-do receiver may be previously set to a specific time segment (e.g., from 9 AM to 6 PM as a local time of a region in which the user terminal 120 is positioned) by a request of the user terminal 120 related to the to-do receiver. In an exemplary embodiment, the time zone-reminder management unit 250 may calculate and derive a receivable time of the to-do receiver based on a local time of a detected time zone such that a receivable time of the to-do receiver automatically matches to a work time (from 9 AM to 6 PM of a Korean local time) of the to-do receiver based on a detected time zone.

The time zone-reminder management unit 250 may delay to add a reminder message to a message thread to a receivable time of the to-do receiver based on a time zone. In an exemplary embodiment, when a generation time of a reminder message does not correspond to a receivable time of the to-do receiver, the time zone-reminder management unit 250 may temporarily store the reminder message at the memory unit and add the reminder message to a message thread corresponding to a chat room related to the reminder message at a time (e.g. 9 AM) in which a receivable time of the to-do receiver starts.

When a to-do status of a reminder to-do item is a complete status, the time zone-reminder management unit 250 may detect a time zone of the to-do provider and delay to add a reminder message to a message thread to a receivable time of the to-do provider. More specifically, until before a to-do status of a reminder to-do item becomes a complete status, the time zone-reminder management unit 250 may detect a time zone based on the to-do receiver corresponding to a work performer of the reminder to-do item, and when a to-do status of a reminder to-do item becomes a complete status, the time zone-reminder management unit 250 may detect a time zone based on a to-do provider corresponding to a work appraiser of the reminder to-do item to optimize and provide the reminder message to an actual necessary person.

In an exemplary embodiment, the reminder set generator 230 may update or instantly update a reminder set based on a time zone of the to-do receiver, and when a reminder set is updated, the reminder message generator 240 may generate a reminder message based on the reminder set and temporarily store the reminder message at a memory unit.

In an exemplary embodiment, the time zone-reminder management unit 250 may temporarily store the generated at least one reminder message until a first time and when a second time arrives, the time zone-reminder management unit 250 may add in a bundle or sequentially each of temporarily stored reminder messages until the first time to a related message thread. For example, the time zone-reminder management unit 250 may add in a bundle reminder messages collected by temporarily storing at the memory unit from 0 to 24 of a previous day based on a Korean local time to each of related at least one message thread at 9 AM of a next day. In an exemplary embodiment, the reminder set generator 230 may perform the process based on a time zone of the to-do receiver. For example, the time zone-reminder management unit 250 may add in a bundle reminder messages collected by temporarily storing at a memory unit from 0 to 24 of a previous day based on a local time of a region in which the user terminal 120 related to the to-do receiver is positioned to each of related at least one message thread at 9 AM of a next day based on the local time.

When the to-do receiver is at least two persons and the at least two to-do receivers are related to the same chat room, the time zone-reminder management unit 250 may detect a time zone of each of the at least two to-do receivers and enable the two to-do receivers to delay to add a reminder message to a message thread to an intersection time of receivable times. For example, when the to-do receiver included in a specific reminder to-do item is two persons and while the two to-do receivers (e.g., A and B) are participating at the same chat room, if a time zone of each of the to-do receivers do not correspond (e.g., when A is in Korea and B is on a business trip in the US), the time zone-reminder management unit 250 may detect time zones of each of the two to-do receivers to detect overlapped intersection time among receivable times (e.g., A is at 9 AM-9 PM based on a Korean time, and B is at 9 AM-9 PM based on a New York time of the US (10 PM-10 AM based on a Korean time)) of each of the to-do receivers (9 AM-10 AM based on Korean local time) and to delay to add the reminder message to a message thread related to the chat room until an intersection time starts.

In the foregoing exemplary embodiment, when an intersection time is not determined (e.g., when an overlapped time does not exist), the time zone-reminder management unit 250 may delay to add the reminder message to the message thread to a receivable time of a preferentially designated to-do receiver (e.g., in a process in which a to-do item is generated, a to-do receiver first designated by the to-do provider) among the at least two to-do receivers.

In an exemplary embodiment, the time zone-reminder management unit 250 may manage the delayed at least one reminder message through the user terminal 120 related to the to-do provider or the to-do receiver. For example, the time zone-reminder management unit 250 may enable the to-do provider to cancel at least one reminder message in a standby status, to change to instantly transmit at least one reminder message in a standby status, or to directly change a to-do status of at least one reminder message in a standby status through a reminder sending standby box including reminder messages temporarily stored and in a standby status according to the delay.

When the user terminal 120 requests addition of a specific to-do item to a specific message thread corresponding to a chat room related thereto, the time zone-to-do item management unit 260 may detect a time zone of the to-do receiver and add the to-do item to the message thread to a receivable time of the to-do receiver. For example, when A gives a to-do item to B as a target, the time zone-to-do item management unit 260 may request generation of a to-do item including the to-do provider A, the to-do receiver B, to-do contents (week report), and the deadline (to May 10 day) through the user terminal 120 related to the A to the chat room based reminder apparatus 110, and the time zone-to-do item management unit 260 may generate a to-do item and detect a time zone of B corresponding to the to-do receiver, and when a current time does not correspond to a receivable time of B, the time zone-to-do item management unit 260 may provide a message that can select one of 'immediate send' and 'reservation to send' to the user terminal 120 of A, and when an 'immediate send' request is received from the user terminal 120 of A, the time zone-to-do item management unit 260 may instantly add the generated to-do item to a related message thread, and when a 'reservation to send' request is received, the time zone-to-do item management unit 260 may maintain temporary storage of a generated to-do item, and until arriving at a receivable time of B, the time zone-to-do item management unit 260 may temporarily store the to-do item, and when a current time corresponds to a receivable time of B, the time zone-to-do item management unit 260 may add the to-do item to the message thread and enable the to-do item to be recorded at the chat room.

In the foregoing exemplary embodiment, while a current time does not correspond to a receivable time of B, A may request cancellation of a to-do item that is not added to the message thread to the time zone-to-do item management unit 260.

When a reminder message related to a specific to-do item is added to a related message thread, the time zone-reminder management unit 250 may store providing information of the reminder message to be related to the specific to-do item, and for example, when a reminder message of a specific to-do item is first added to a related message thread, the time zone-reminder management unit 250 may transmit the addition to the to-do item set preparation unit 210 to enable the to-do item set preparation unit 210 to reflect and store the providing number of the reminder message related to the specific to-do item to one time. In an exemplary embodiment, in a process of preparing a to-do item set, the to-do item set preparation unit 210 may calculate a to-do processing speed of each of at least one to-do item related to the user based on the providing number of a reminder message already added to the message thread and include the to-do processing speed in the to-do item. Here, a to-do processing speed may represent that the to-do receiver interacts to which reminder message to change a to-do status of the to-do item, and a small calculation value means that a work processor processes a work with a rapid interaction. For example, after the reminder message is provided twice, when the to-do receiver changes a to-do status in response to the reminder message, a to-do processing speed of the to-do item becomes 2. In an exemplary embodiment, the to-do item set preparation unit 210 may calculate and store a to-do processing speed of the to-do receiver related to a to-do item on a to-do status basis of a to-do item.

In an exemplary embodiment, the to-do item set preparation unit 210 may calculate an average to-do processing speed of the to-do receiver based on the providing number of a reminder related to a to-do item and a to-do processing speed of the to-do receiver calculated on a to-do status basis. For example, when the number in which the to-do receiver changes a to-do status is total 38 in response to provided reminder messages and an average value of calculated to-do processing speeds is 2.3, the to-do item set preparation unit 210 may calculate an average to-do processing speed to 2.3 @ 38.

In an exemplary embodiment, the to-do item set preparation unit 210 may relatively calculate an average to-do processing speed to be related to at least one specific member. In an exemplary embodiment, when a to-do processing speed providing request related to a user and including at least one member is received from the user terminal 120, the to-do item set preparation unit 210 may calculate an average to-do processing speed based on at least one to-do item in which at least one member is related as the to-do provider in the to-do item set and provide the average to-do processing speed to the user terminal 120.

For example, in a process of calculating an average to-do processing speed based on a to-do item set related to a specific user (Seunghoon Kwak), the to-do item set preparation unit 210 may filter a specific member (Jaeho Choi) and to-do items related as the to-do provider according to a request of the user terminal 120 to calculate an average to-do processing speed or may filter to-do items in which each member in a specific member group (e.g., production team 1) is related as the to-do provider to calculate an average to-do processing speed. The to-do item set preparation unit 210 may calculate a group average to-do processing speed of a specific member group based on to-do item sets related to a specific member group (e.g., production team 1) according to a request of the user terminal 120, and in a process of calculating a group average to-do processing speed, the to-do item set preparation unit 210 may relatively calculate a group average to-do processing speed related to another specific member group (e.g., management team 2). Accordingly, the to-do item set preparation unit 210 can enable to determine whether a specific member represents which to-do processing speed to another specific member or whether a specific team represents which to-do processing speed to another specific team to improve efficiency of work management and can improve a teamwork by inducing a rapid interaction.

Figure 3:
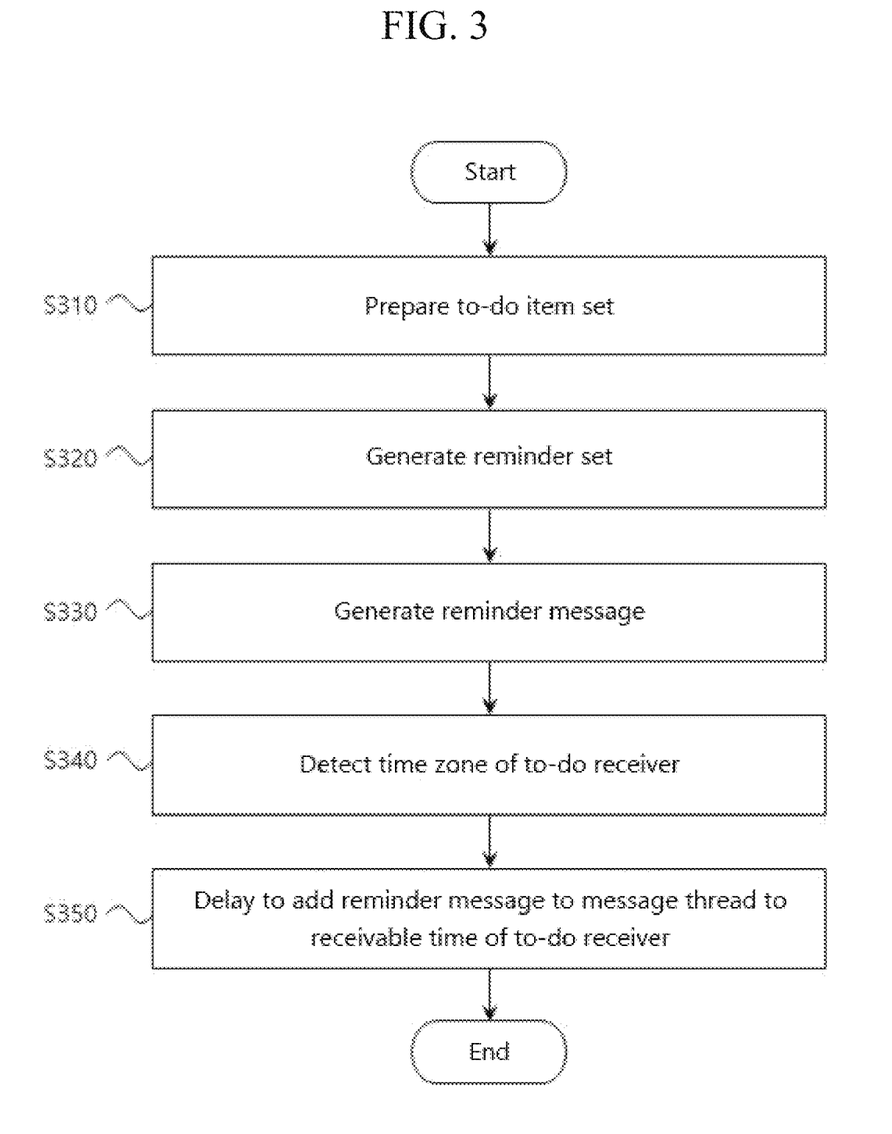
FIG. 3 is a flowchart illustrating an exemplary embodiment of a process in which a chat room based reminder apparatus of FIG. 1 provides a reminder message for a to-do item.

FIG. 3 is a flowchart illustrating an exemplary embodiment of a process in which a chat room based reminder apparatus of FIG. 1 provides a reminder message for a to-do item.

The to-do item set preparation unit 210 may bring a message thread corresponding to a chat room related to the user terminal 120 and a to-do item set of at least one to-do item related to the message thread (step S310).

The reminder set generator 230 may generate a reminder set including at least one reminder to-do item satisfying a reminder condition at the to-do item set (step S320).

The reminder message generator 240 may generate a reminder message including summary information about at least one of a to-do receiver, a to-do provider, to-do contents, a to-do status, and a deadline included in each of at least one reminder to-do item (step S330).

The time zone-reminder management unit 250 may detect a time zone of the to-do receiver related to each of at least one reminder to-do item included in the reminder set (step S340).

The time zone-reminder management unit 250 may delay to add the reminder message to the message thread to a receivable time of the to-do receiver based on a time zone (step S350).

In an exemplary embodiment of the present invention, the chat room based reminder apparatus 110 may provide a reminder of to-do appropriately to a time zone of a to-do receiver to improve work efficiency.

Figure 4:
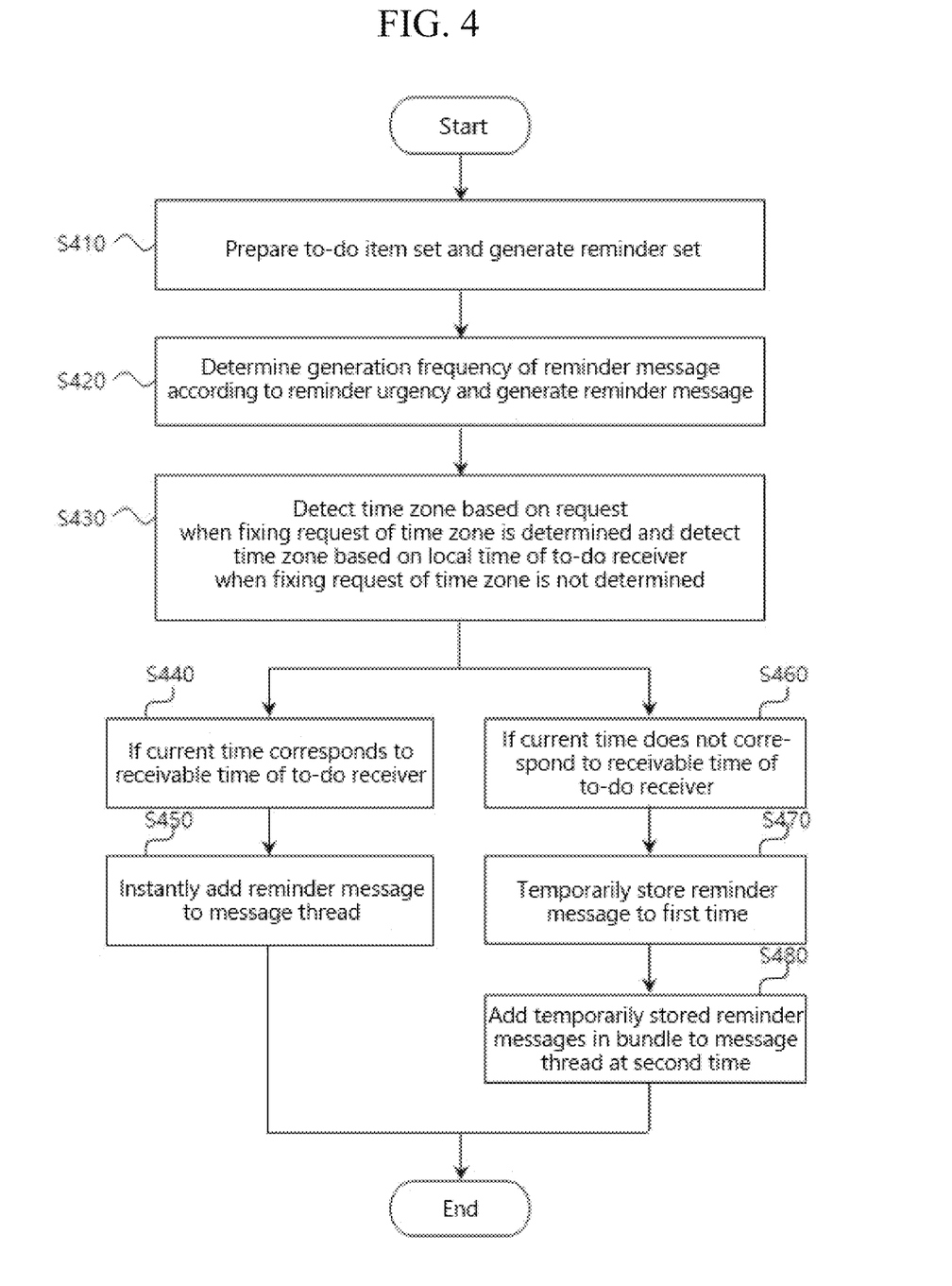
FIG. 4 is a flowchart illustrating an exemplary embodiment of a process in which a chat room based reminder apparatus of FIG. 1 provides a reminder message for a to-do item.

FIG. 4 is a flowchart illustrating an exemplary embodiment of a process in which a chat room based reminder apparatus of FIG. 1 provides a reminder message for a to-do item.

The to-do item set preparation unit 210 may bring a message thread corresponding to a chat room related to a user terminal and a to-do item set of at least one to-do item related to the message thread and generate a reminder set including at least one reminder to-do item satisfying a reminder condition in the to-do item set (step S410).

The reminder set generator 230 may determine reminder urgency based on a to-do status and a deadline of each of at least one reminder to-do item, and the reminder message generator 240 may determine a generation frequency of each of at least one reminder message determined to urgent and generate a reminder message based on the generation frequency (step S420).

When a fixing request of a time zone received from a to-do receiver is not determined, the time zone-reminder management unit 250 may detect a time zone based on a local time of the user terminal 120 related to the to-do receiver, and when a fixing request of a time zone received from a to-do receiver is determined, the time zone-reminder management unit 250 may detect a time zone based on the fixing request (step S430).

The time zone-reminder management unit 250 determines a receivable time of the to-do receiver based on a time zone, and if a current time corresponds to a receivable time of the to-do receiver (step S440), the time zone-reminder management unit 250 may instantly add the generated reminder message to the message thread (step S450).

If a current time does not correspond to a receivable time of the to-do receiver (step S460), the time zone-reminder management unit 250 may temporarily store the generated reminder message to a first time based on the time zone (step S470), and when a current time becomes a second time corresponding to a start time of a receivable time of the to-do receiver, the time zone-reminder management unit 250 may add in a bundle each of the reminder messages temporarily stored up to the first time to the related message thread (step S480).

Figure 5:
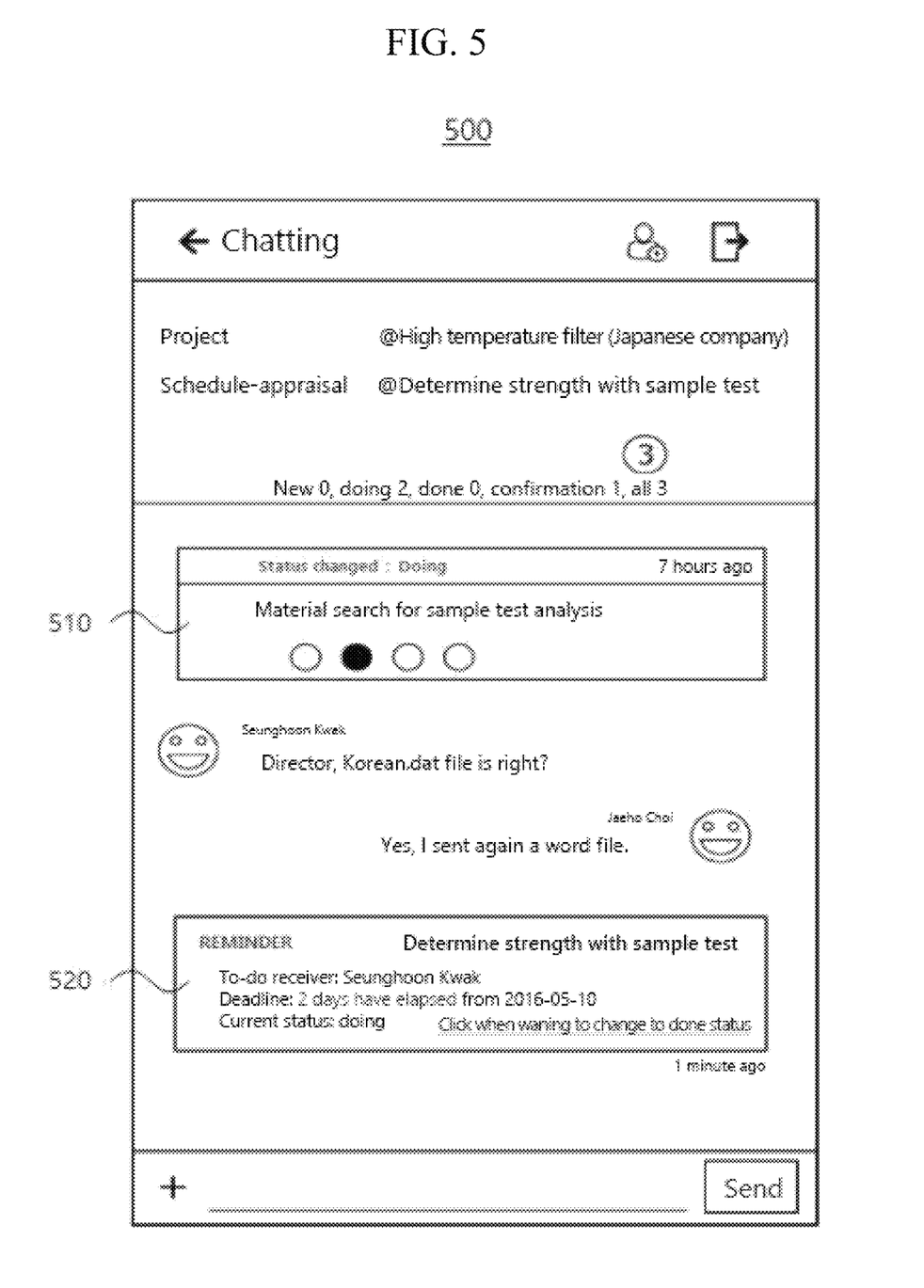
FIG. 5 is a diagram illustrating a process in which a chat room based reminder apparatus of FIG. 1 provides a reminder message to a related chat room through a user terminal.

FIG. 5 is a diagram illustrating a process in which a chat room based reminder apparatus FIG. 1 provides a reminder message to a related chat room through a user terminal.

In FIG. 5, the chat room based reminder apparatus 110 may provide a chat room 500 related to the user terminal 120 through the user terminal 120, provide generation or an execution status change of a related to-do item 510 within the chat room, and provide a related reminder message 520 to the user terminal 120 through a process of adding the related reminder message 520 to a related message thread at a receivable time of the to-do receiver. As can be seen in a description described with reference to FIG. 5 and the foregoing description, the chat room based reminder apparatus 110 may add visual display (display an edge with a red color) to the reminder message 520 determined to urgent to emphasize the message and provide the reminder message 520 including a status change button (change from a 'doing' status to a 'done' status by the to-do receiver) that can change the to-do status to a next to-do status.

Figure 6:
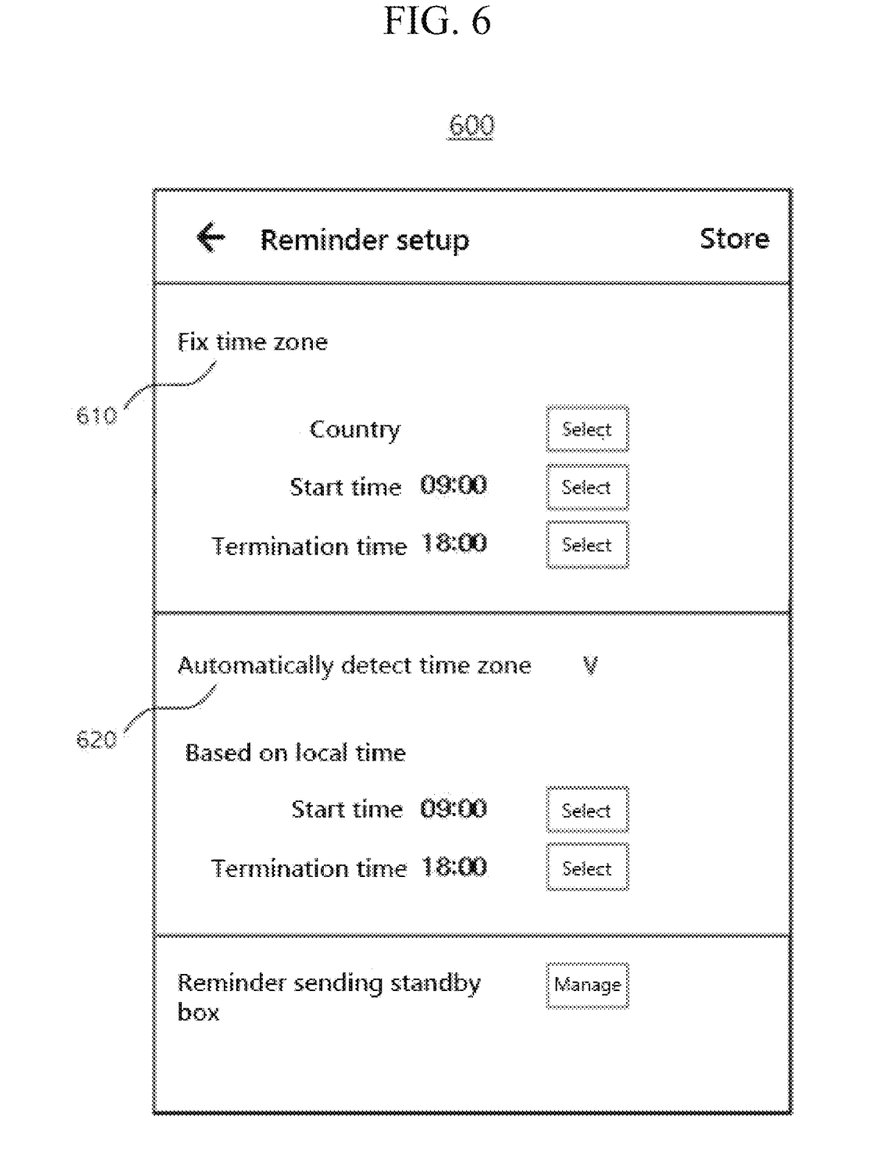
FIG. 6 is a diagram illustrating a process in which a chat room based reminder apparatus of FIG. 1 provides a user designation setup menu for a reminder message through a user terminal.

FIG. 6 is a diagram illustrating a process in which a chat room based reminder apparatus of FIG. 1 provides a user designation setup menu of a reminder message through a user terminal.

In FIG. 6, the chat room based reminder apparatus 110 may provide a reminder message setup menu 600 related to the user terminal 120 through the user terminal 120. As can be seen in a description described with reference to FIG. 6 and the foregoing description, the chat room based reminder apparatus 110 may receive a setup request of time zone fixing 610 or time zone automatic detection 620 from the user terminal 120 through the reminder message setup menu 600, detect a receivable time of the to-do receiver or the to-do provider based on the setup request in a process of generating a reminder message using the to-do receiver or the to-do provider determined to a major receiver as a target according to a to-do status of the to-do item, and provide a reminder message optimized to a reception target.

Figure 7:
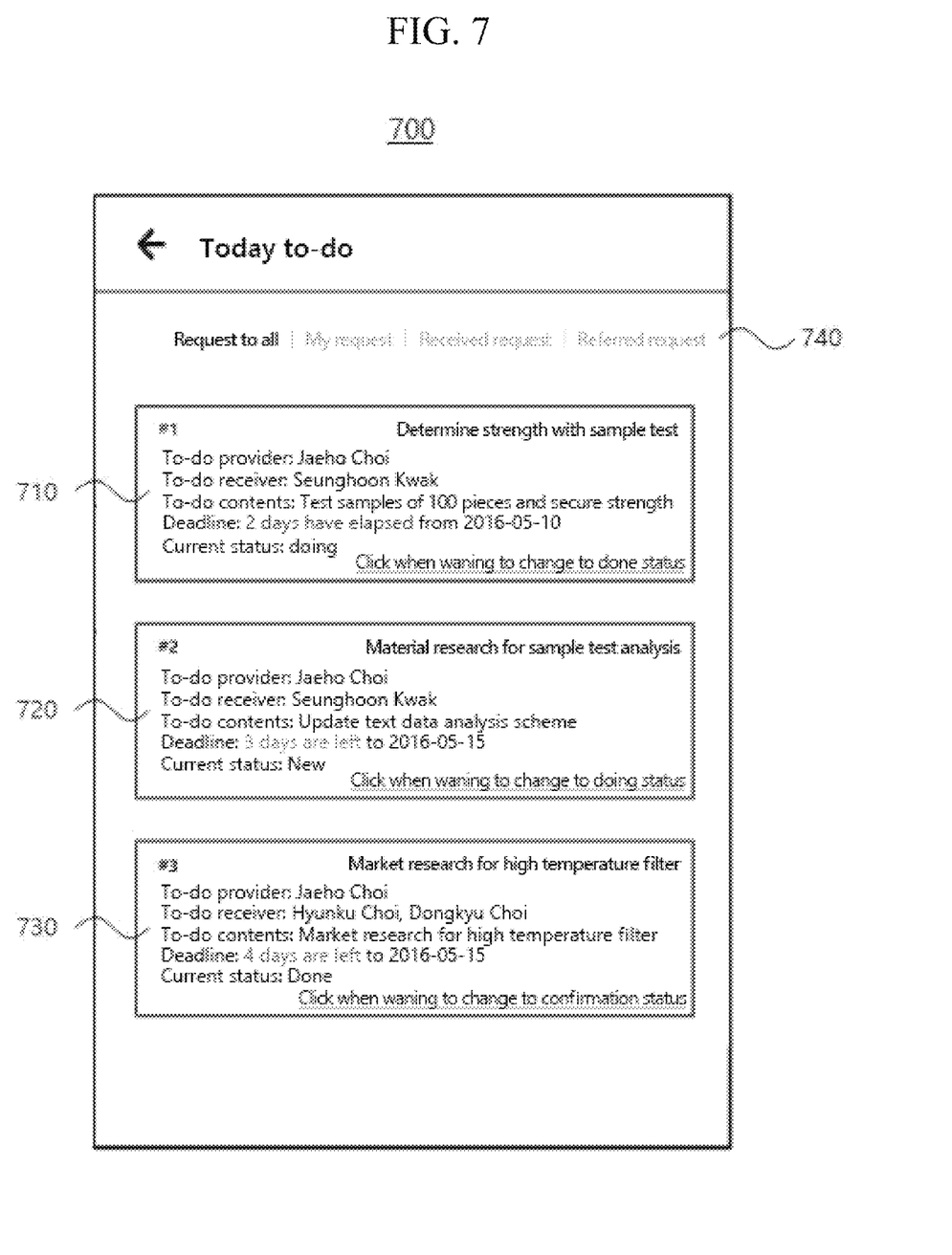
FIG. 7 is a diagram illustrating a process in which a chat room based reminder apparatus of FIG. 1 provides today to-do through a user terminal.

FIG. 7 is a diagram illustrating a process in which a chat room based reminder apparatus of FIG. 1 provides today to-do through a user terminal.

In FIG. 7, the chat room based reminder apparatus 110 may provide today to-do 700 based on reminder to-do items related to the user terminal 120 through the user terminal 120. As can be seen in a description described with reference to FIG. 7 and the foregoing description, the chat room based reminder apparatus 110 may include related summary information through the today to-do 700 and provide a list of reminder to-do items aligned according to reminder urgency to the user terminal 120. For example, the chat room based reminder apparatus 110 may align and provide a to-do item 710 for 'determine strength with a sample test', a to-do item 720 for 'material research for sample test analysis', and a to-do item for 'market research for a high temperature filter' according to reminder urgency determined based on a deadline. Further, the chat room based reminder apparatus 110 may classify 740 today to-do into 'request to all', 'my request', 'received request', or 'referred request' to provide the today to-do to the user terminal 120. In an exemplary embodiment, in order to enable the user terminal 120 that is not designated to the to-do provider or to-do receiver of the to-do item but is designated to a to-do reference person thereof to together share an execution situation of the to-do item, the chat room based reminder apparatus 110 may provide a reminder to-do item to the today to-do 700.

Although exemplary embodiments of the present disclosure have been described in detail hereinabove, it should be clearly understood that many variations and modifications of the basic inventive concepts herein described, which may appear to those skilled in the art, will still fall within the spirit and scope of the exemplary embodiments of the present disclosure as defined in the appended claims.

Advantages

Disclosed technology can have the following effects. However, it does not mean that a specific exemplary embodiment should include the entire following effects or should include only the following effects, and it should not be understood that the scope of disclosed technology is limited thereto.

A method and apparatus for providing a reminder based on a chat room according to an exemplary embodiment of the present invention can improve work efficiency by providing a reminder of to-do appropriately to a time zone of a to-do receiver.

A method and apparatus for providing a reminder based on a chat room according to an exemplary embodiment of the present invention can provide an optimized reminder message by considering a situation in which a reminder target is changed according to a to-do execution status and by reflecting a receivable time based on a local time of a major receiver of a reminder.

A method and apparatus for providing a reminder based on a chat room according to an exemplary embodiment of the present invention can provide today to-do based on reminder to-do items related to a user terminal.

What is claimed is:

1. A method of providing a reminder based on a chat room performed by a chat room based reminder apparatus connected to at least one user terminal, the method comprising:
    managing a message thread corresponding to a chat room related to a user terminal of the at least one user terminal and a to-do item set including at least one to-do item related to the message thread and comprising a to-do receiver, to-do contents, a to-do status, a to-do provider that provides the to-do item to the to-do receiver, and a deadline;
    generating a reminder set comprising at least one reminder to-do item satisfying a reminder condition in the to-do item set;
    generating a reminder message for each of the at least one reminder to-do item;
    detecting a time zone of the to-do receiver and delaying to add the reminder message to the message thread to a receivable time of the to-do receiver; and
    selecting, from among the to-do provider and the to-do receiver and based on the to-do status, a target to which the reminder message is provided,
    wherein the to-do status is at least one of a 'new' status, a 'doing' status, a 'done' status, a 'confirmation' status, and a 'complete' status according to an execution status on a processing step of the to-do item,
    wherein the reminder message is provided to the to-do receiver based on the selection of the to-do receiver as the target when the to-do status is one of the 'new' status or the 'doing' status, and
    wherein the reminder message is provided to the to-do provider based on the selection of the to-do provider as the target when the to-do status is the 'done' status.

2. The method of claim 1, wherein the reminder condition is determined based on at least one of the to-do status and the deadline.

3. The method of claim 2, wherein the generating of the reminder message comprises determining reminder urgency based on the to-do status and the deadline of each of at least one reminder to-do item satisfying the reminder condition.

4. The method of claim 3, wherein the generating of the reminder message comprises determining a generation frequency of the reminder message based on the reminder urgency.

5. The method of claim 1, wherein the detecting of the time zone comprises detecting the time zone based on a local time of a user terminal related to the to-do receiver, when a fixing request of the time zone received from the to-do receiver is not determined, and detecting the time zone based on the fixing request, when a fixing request of the time zone received from the to-do receiver is determined.

6. The method of claim 1, wherein the generating of the reminder message comprises updating the reminder set based on the detected time zone of the to-do receiver.

7. The method of claim 1, wherein the detecting of the time zone comprises detecting a time zone of a to-do provider, when a to-do status of the reminder to-do item is a complete status, and delaying to add the reminder message to a message thread to a receivable time of the to-do provider.

8. The method of claim 1, wherein the detecting of the time zone comprises detecting the time zones of each of at least two to-do receivers and delaying to add the reminder message to the message thread to an intersection time of receivable times of the two to-do receivers, when the at least two to-do receivers are at least two persons and when the at least two to-do receivers are related to the same chat room.

9. The method of claim 8, wherein the detecting of the time zone comprises delaying to add the corresponding reminder message to the message thread to a receivable time of a preferentially designated to-do receiver among the at least two to-do receivers, when the intersection time is not determined.

10. The method of claim 1, wherein the generating of the reminder message comprises providing today to-do based on the at least one reminder to-do item to the user terminal, the today to-do including a list of the at least one reminder to-do item.

11. The method of claim 1, wherein the generating of the reminder message comprises generating the reminder message comprising a status change button that changes summary information and the to-do status of each of the at least one reminder to-do item to a next to-do status.

12. The method of claim 1, wherein the managing of the message thread comprises calculating a to-do processing speed based on a providing number of a reminder message already added to the message thread of each of the at least one to-do item and comprising the to-do processing speed in the to-do item.

13. The method of claim 12, wherein the managing of the message thread comprises calculating an average to-do processing speed based on at least one to-do item in which at least one member is related as a to-do provider among the to-do item sets and providing the average to-do processing speed to the user terminal, when a to-do processing speed providing request related to a user and comprising at least one member is received from the user terminal.

14. The method of claim 1, further comprising:
detecting a time zone of a to-do receiver and delaying to add a to-do item to a message thread to a receivable time of the to-do receiver, when the user terminal requests addition of a specific to-do item to a specific message thread corresponding to a chat room related to the user terminal.

15. The method of claim 1, wherein the reminder message is not provided to the to-do provider and not provided to the to-do receiver based on the selection of neither of the to-do provider and the to-do receiver as the target when the to-do status is the 'confirmation' status.

16. A chat room based reminder apparatus, comprising:
circuitry configured to:
manage a message thread corresponding to a chat room related to a user terminal and a to-do item set including at least one to-do item related to the message thread and comprising a to-do receiver, to-do contents, a to-do status, a to-do provider that provides the to-do item to the to-do receiver, and a deadline;
generate a reminder set comprising at least one reminder to-do item satisfying a reminder condition at the to-do item set;
generate a reminder message of each of the at least one reminder to-do item;
detect a time zone of the to-do receiver and that delays to add the reminder message to the message thread to a receivable time of the to-do receiver; and
select, from among the to-do provider and the to-do receiver and based on the to-do status, a target to which the reminder message is provided,
wherein the to-do status is at least one of a 'new' status, a 'doing' status, a 'done' status, a 'confirmation' status, and a 'complete' status according to an execution status on a processing step of the to-do item,
wherein the reminder message is provided to the to-do receiver based on the selection of the to-do receiver as the target when the to-do status is one of the 'new' status or the 'doing' status, and
wherein the reminder message is provided to the to-do provider based on the selection of the to-do provider as the target when the to-do status is the 'done' status.

* * * * *